US011311825B2

(12) United States Patent
Hess

(10) Patent No.: US 11,311,825 B2
(45) Date of Patent: Apr. 26, 2022

(54) SPA FILL HOSE FILTER

(71) Applicant: John E. Hess, Tulsa, OK (US)

(72) Inventor: John E. Hess, Tulsa, OK (US)

( * ) Notice: Subject to any disclaimer, the term of this patent is extended or adjusted under 35 U.S.C. 154(b) by 55 days.

(21) Appl. No.: 16/670,756

(22) Filed: Oct. 31, 2019

(65) Prior Publication Data
US 2020/0238204 A1 Jul. 30, 2020

Related U.S. Application Data

(60) Provisional application No. 62/753,799, filed on Oct. 31, 2018.

(51) Int. Cl.
| | |
|---|---|
| *B01D 29/23* | (2006.01) |
| *C02F 1/00* | (2006.01) |
| *C02F 1/76* | (2006.01) |
| *C02F 1/68* | (2006.01) |
| *C02F 103/42* | (2006.01) |

(52) U.S. Cl.
CPC .............. *B01D 29/23* (2013.01); *C02F 1/001* (2013.01); *C02F 1/688* (2013.01); *C02F 1/76* (2013.01); *B01D 2201/0423* (2013.01); *B01D 2201/291* (2013.01); *B01D 2201/4092* (2013.01); *C02F 2103/42* (2013.01); *C02F 2201/004* (2013.01)

(58) Field of Classification Search
CPC ............ B01D 29/23; B01D 2201/4092; B01D 2201/0423; B01D 2201/291; B01D 2201/4015; B01D 35/02; C02F 1/001; C02F 1/76; C02F 1/688; C02F 2201/004; C02F 2103/42; C02F 1/444; E04H 4/1209

USPC ..................... 210/167.11, 203, 232, 460, 206
See application file for complete search history.

(56) References Cited

U.S. PATENT DOCUMENTS

| | | | | |
|---|---|---|---|---|
| 1,658,830 | A * | 2/1928 | Bingham ............ | A61M 3/0279 239/315 |
| 2,985,307 | A * | 5/1961 | Grasmere .............. | B01D 29/21 210/167.11 |
| 3,650,405 | A * | 3/1972 | Morrison ................ | C02F 1/763 210/241 |
| 3,947,362 | A * | 3/1976 | Etani ..................... | B01D 29/111 210/416.2 |
| 5,089,108 | A * | 2/1992 | Small ..................... | B01D 24/08 210/287 |
| 5,662,796 | A * | 9/1997 | Kerecz .................. | B01D 29/15 210/167.1 |
| 5,882,512 | A * | 3/1999 | Denkewicz, Jr. ..... | B01F 1/0027 210/167.11 |
| 6,217,754 | B1 * | 4/2001 | Ros ........................ | C02F 1/004 210/167.11 |

(Continued)

*Primary Examiner* — Fred Prince
(74) *Attorney, Agent, or Firm* — Scott Zingerman

(57) ABSTRACT

The filter includes a body, cap, and a filter media. The body includes an internal chamber and a plurality of perforations exposing the internal chamber. A filter media is positioned and retained in the internal chamber such that it covers the plurality of perforations. The internal chamber is in fluid communication with a water fill hose so as to receive water and dispense the water out of the body through the plurality of perforations after having passed through the filter media. The cap is adapted to cover the open top of the body. The cap includes a threaded passage for receiving a male threaded connector on the hose. The internal chamber is preferably filled with sanitizer preferably selected from a group consisting of an oxidizer and chlorine.

19 Claims, 11 Drawing Sheets

(56) References Cited

U.S. PATENT DOCUMENTS

| | | | | |
|---|---|---|---|---|
| 6,358,425 B1 * | 3/2002 | King | ............ | C02F 1/50 |
| | | | | 137/268 |
| 6,949,198 B2 * | 9/2005 | Reber | ............ | A62C 33/00 |
| | | | | 210/170.09 |
| 7,160,446 B2 * | 1/2007 | Bergstrom | ............ | B01D 35/30 |
| | | | | 210/167.11 |

* cited by examiner

SPA FILL HOSE FILTER

CROSS REFERENCE TO RELATED APPLICATION

This application claims the benefit of U.S. Provisional Application No. 62/753,799 filed Oct. 31, 2018, herein incorporated by reference in its entirety for all purposes.

FIELD OF THE INVENTION

The present invention relates, generally, to devices used for filtering water in a pool, spa or hot tub and particularly for filtering water used to fill a pool, spa, or hot tub.

BACKGROUND OF THE INVENTION

Spas, hot tubs, and pools (hereinafter "spa" or "spas") upon set-up and thereafter, require filling with water prior to use. It is common to employ tap water for such filling. In residential installations, such filling is commonly accomplished through the connection of a hose, often a common residential garden hose, to an external water valve or other such water line from an available water source. Such hoses and water sources are known to contain dirt, sticks, and other debris. As a result, a filter of some sort to filter contaminants from the water supplied to the spa is recommended.

Known spa and pool filters for this purpose often include filter media which substantially restricts the water flow rate/volume supplied by the water source. As a result of such restriction, it is known that use of such filters substantially extends the time required to fill the spa as opposed to unrestricted water flow. A need, therefore, exists for a spa hose filter which provides beneficial filtration without substantially restricting the flow of fill water into the spa.

Once the spa is filled with water, it is also advisable or even necessary to sanitize the water as a second independent step. Present known fill filter devices lack the ability to introduce sanitizer to the in-flow water stream. A need, therefore, exists for a spa hose filter device which provides the capability of introducing sanitizer to the input water stream.

SUMMARY OF THE INVENTION

The present invention is a filter for use with a hose (such as a household garden hose) that conveys water to fill a spa or hot tub ("spa" herein). It is contemplated that the filter may be used to filter water from a hose to fill a spa, typically, 400 gallons (but may be longer or smaller), pool or 2,000-gallon swim spa. The filter includes, generally, a body, cap, and a filter media. The body includes an internal chamber and a plurality of perforations exposing the internal chamber.

A filter media is positioned and retained in the internal chamber such that it covers the plurality of perforations on the inside of the body. The internal chamber is in fluid communication with the water fill hose so as to receive water and dispense the water out of the body through the plurality of perforations after having passed through the filter media. The cap is adapted to cover the open top of the body. The cap includes a threaded passage for receiving a male threaded connector on a hose. The hose may be a common garden hose or a specially adapted hose with a threaded connector which mates the threads of the threaded passage of the cap.

The internal chamber is preferably filled with sanitizer preferably selected from a group consisting of an oxidizer and chlorine. Alternatively, the chamber could be filled with chlorine only, or oxidizer only, or some other selected chemical or water treatment product.

The filter media is cut from filter cloth and may be any desired porosity. The body also includes a solid wall segment on its external circumference to protect the seam in the filter media. The closed bottom of the body includes a lattice for positioning the filter media in the internal cavity.

The present disclosure thus describes a filter for filling a spa, or pool which filters the water from debris and contaminates, which does not unduly restrict the flow of water so as not to unduly extend the fill time of the spa or pool (30 minutes, as opposed to 4 hours) for a standard 400-gallon spa. In addition, the filter of the present disclosure provides the ability to introduce sanitizer to the water such that the spa or pool water is sanitized upon fill. It is contemplated that the filter of the present disclosure could be reusable as a household hose filter for uses such as, without limitation, water to wash cars or other vehicles, or structures, filter water to clean windows, or even refill outdoor pet or livestock water supplies. It is further contemplated that sanitizer could be added/refilled into the filter when the spa or pool is refilled or topped off.

The foregoing has outlined in broad terms the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention.

DETAILED DESCRIPTION OF THE PREFERRED EMBODIMENTS

Figure 1:
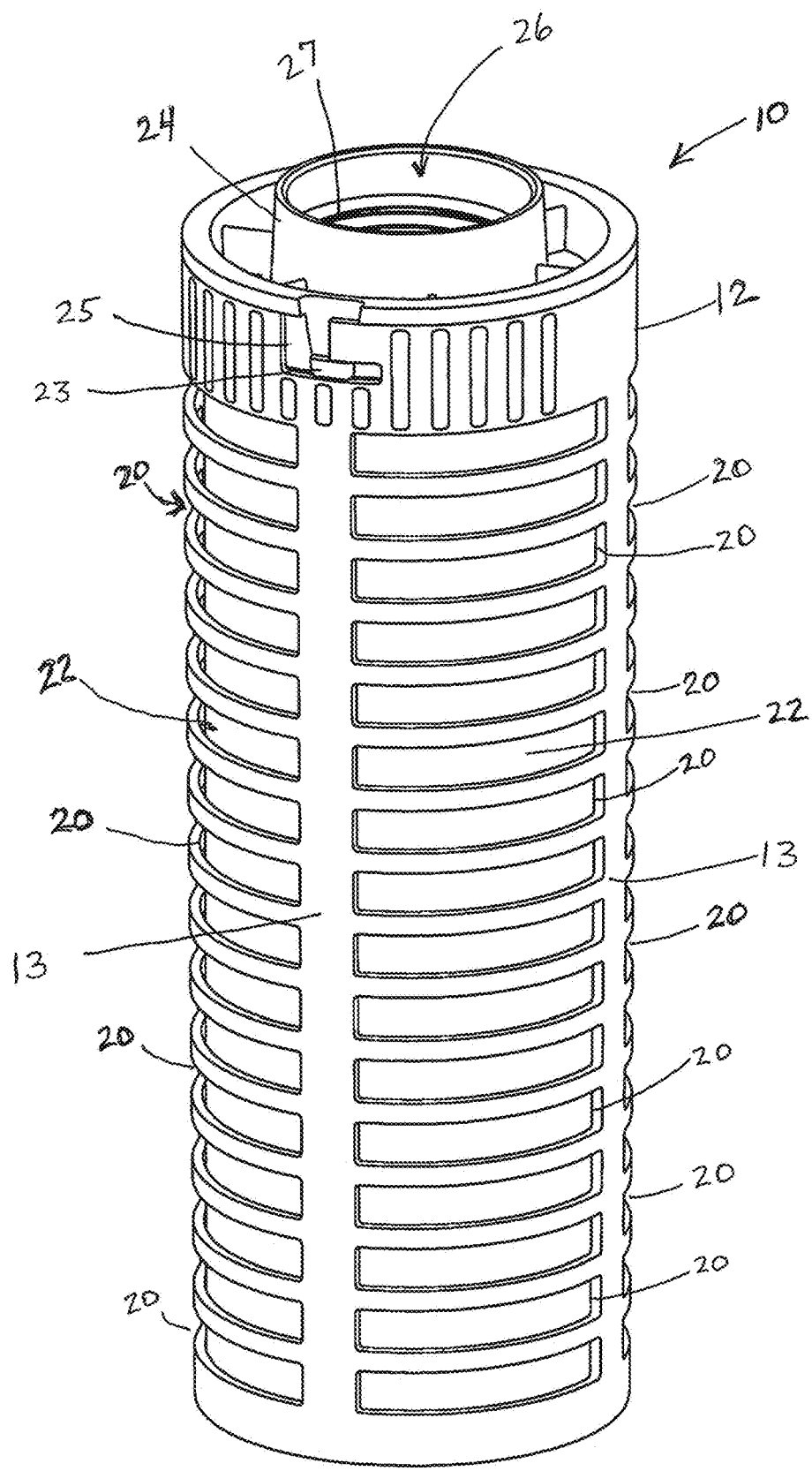
FIG. 1 is a side view of the spa fill hose filter of the present disclosure.
Figure 2:
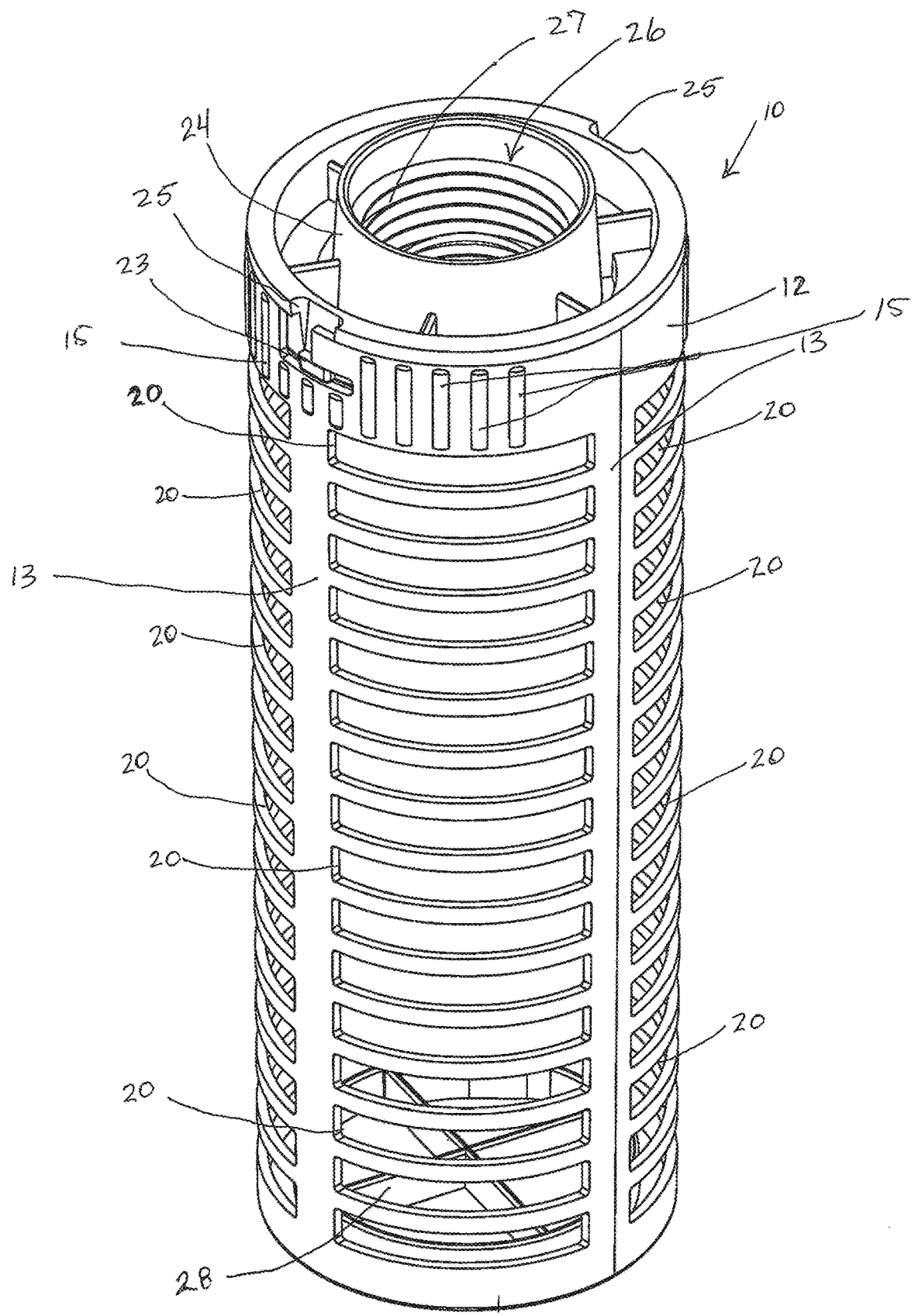
FIG. 2 is a side view of the perforated body of the spa fill hose filter of the present disclosure.

The embodiments herein and the various features and advantageous details thereof are explained more fully with reference to the non-limiting embodiments that are illustrated in the accompanying drawings and detailed in the following description. Descriptions of well-known components and processes and manufacturing techniques are omitted so as to not unnecessarily obscure the embodiments herein. The examples used herein are intended merely to facilitate an understanding of ways in which the invention herein may be practiced and to further enable those of skill in the art to practice the embodiments herein. Accordingly, the examples should not be construed as limiting the scope of the claimed invention.

The present disclosure is for a filter for use with a hose that conveys water to fill a spa. The hose is preferably a garden hose having a male threaded connector, widely known in the art. A standard garden hose in the U.S. includes standard garden hose thread (GHT) as known to one of ordinary skill in the art. Such threads could be National Hose ¾-11.5 (NH) as per ANSI-ASME B1.20.7, incorporated fully herein by reference. However, it should be understood that the hose could include any other desired thread such as, without limitation, British Standard Pipe Thread (BSP) or others or even a custom connector that mates the connector of filter 10 of the present disclosure.

With reference to the Figures, the filter 10 of the present invention preferably includes a cylindrical body 12 including an external circumference, an internal chamber or cavity 14, an open top 16 and a closed bottom 18. It is understood, however, that body 12 could be designed in other chosen geometries, other than cylindrical.

The external circumference of body 12 includes at least one perforation exposing the internal chamber and preferably a plurality of perforations, collectively 20. A filter media covers the perforations. A cap 24 is adapted for covering open top 16 of body 12. Cap 24 includes a passage 26 having female threads 28 which mate the male threaded connector of hose 30. It should be understood, however, that cap 24 could include any desired connector to make a connector on a hose.

Cap 24 may be formed as a solid part of body 12 or, in a preferred embodiment, molded separately and secured to body 12 by any suitable means. In the preferred arrangements a pair (or plurality) of tabs 23 extend from cap 24 into mating slots 25 in body 12. Cap 24 is then rotated such that tabs 23 are secured in slots 25 thus securing cap 24 to body 12.

Figure 5:
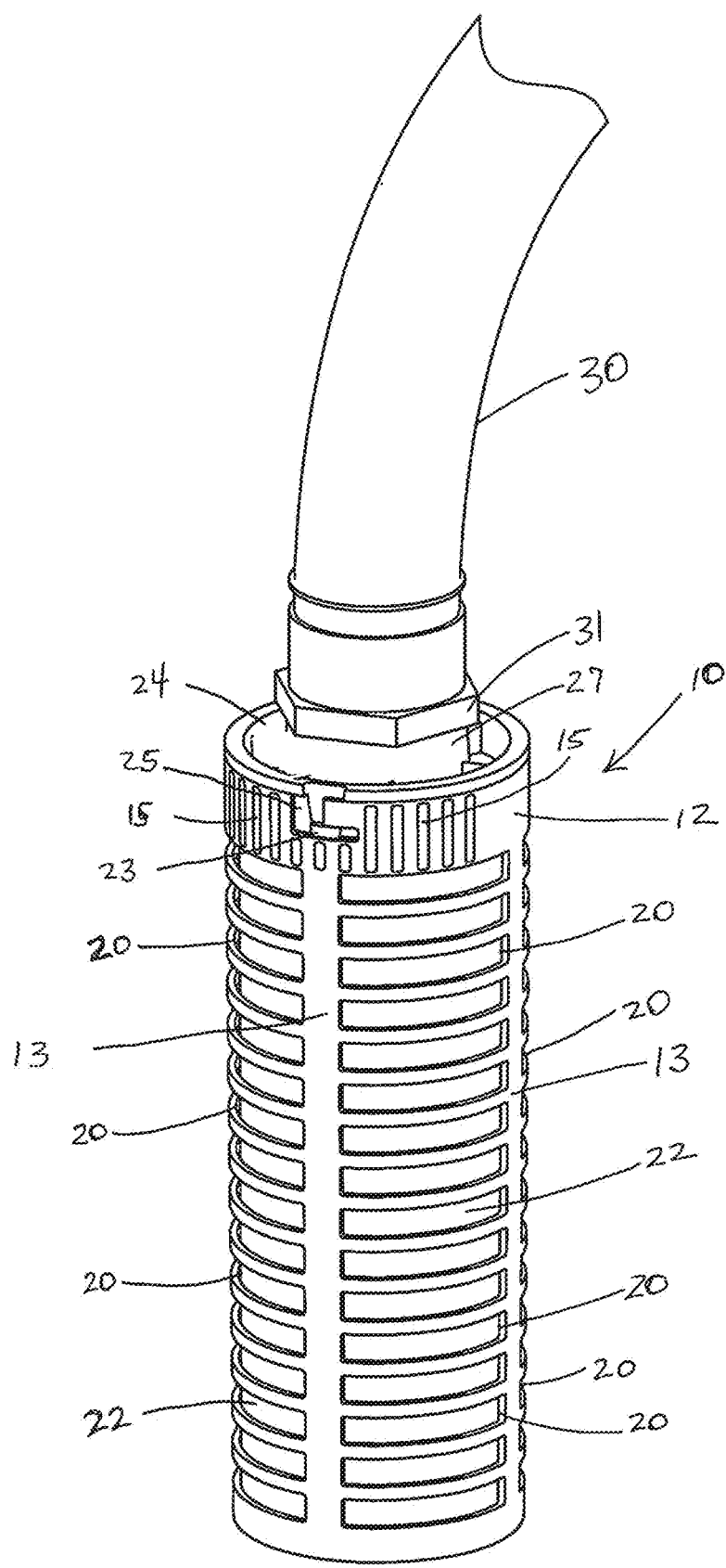
FIG. 5 is a side view of the spa hose filter of the present disclosure depicted with filter media positioned in the internal cavity and with a hose threaded into the cap.

Body 12 is adapted for receiving water from hose 30 through passage 26, into internal chamber 14 and finally dispensing the water from the perforations 20 after having passed through filter media 22. Perforations 20 are preferably molded into and along the cylindrical length of body 12 and spaced such that vertical supports 13 assist in the structural integrity of body 12. The upper segment of body 12, adjacent cap 24, may be knurled, or include tactile indicia, collectively 15, which may be aesthetic, or may assist in securing filter 10 to a hose (FIG. 5).

Internal chamber 14 of body 12 is, preferably, filled with sanitizer (not shown and typically a powder and/or a water-soluble tablet) which may include chlorine, oxidizer, or most preferably a combination of chlorine and oxidizer. The sanitizer is intended to dissolve in the fill water, pass through filter media 22, and be contained in the water filling the spa. By way of non-limiting example, for a typical 400-gallon spa, it is contemplated that 1 oz. of chlorine and 1 oz. of oxidizer would be deposited into internal cavity 14. Alternatively, internal chamber 14 could be empty or may include any other preselected and/or premeasured chemical or water treatment product. This may include, without limitation, metallic elemental purifiers, fungicides, etc.

Figure 3:
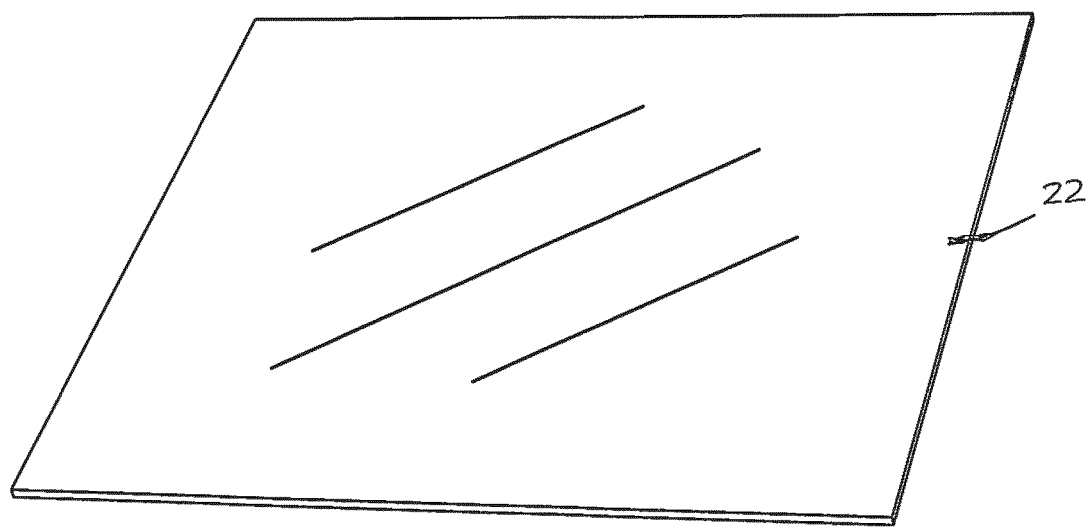
FIG. 3 depicts the filter media of the spa hose filter of the present disclosure laid flat.
Figure 4A:
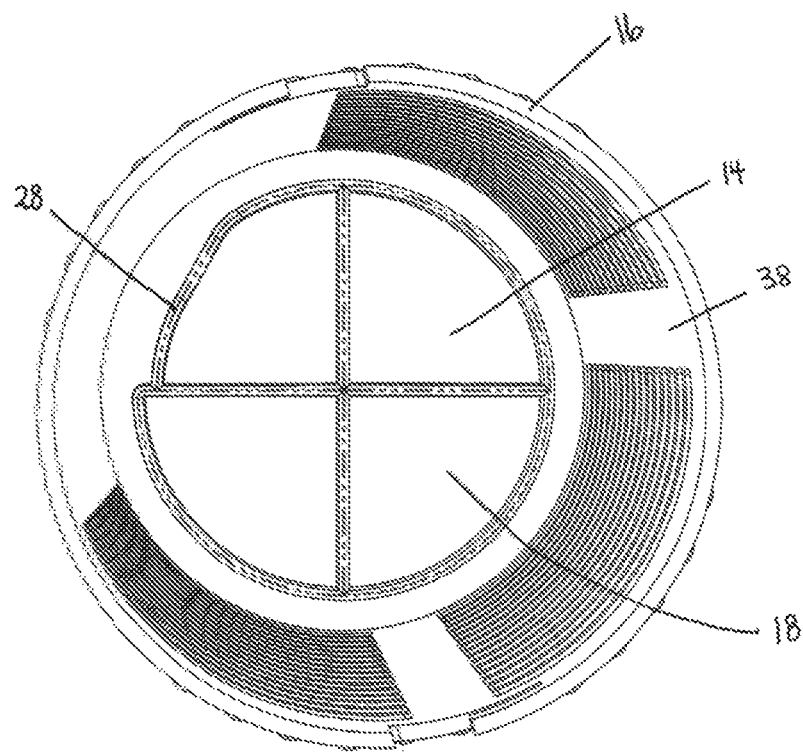
FIG. 4A is a top plan view of the internal chamber of the spa hose filter of the present disclosure with the cap removed to expose the internal lattice supporting the filter media inserted therein.

With reference to FIG. 3, filter media 22 in a preferred embodiment is a 25 micron filter cloth. Such cloth is available commercially from sources such as Micronics, Inc. 200 West Road, Portsmouth, N.H. or U.S. Fabrics, 3904 Virginia Ave., Cincinnati, Ohio. Although any desired porosity of filter cloth is contemplated, 25 micron is preferable because it is the typical porosity of many spa filters. Additionally, the porosity should preferably be selected so as not to unduly restrict water flow through filter 10 which might otherwise extend fill of the spa. Filter media 22 is cut in preferably square or rectangular sections (FIG. 3) which are rolled in a cylindrical geometry and inserted into internal cavity 14 (FIG. 4A). The closed bottom 18 of body 12 includes a lattice 28 which acts to position and retain filter media 22 within internal cavity 14.

Figure 4B:
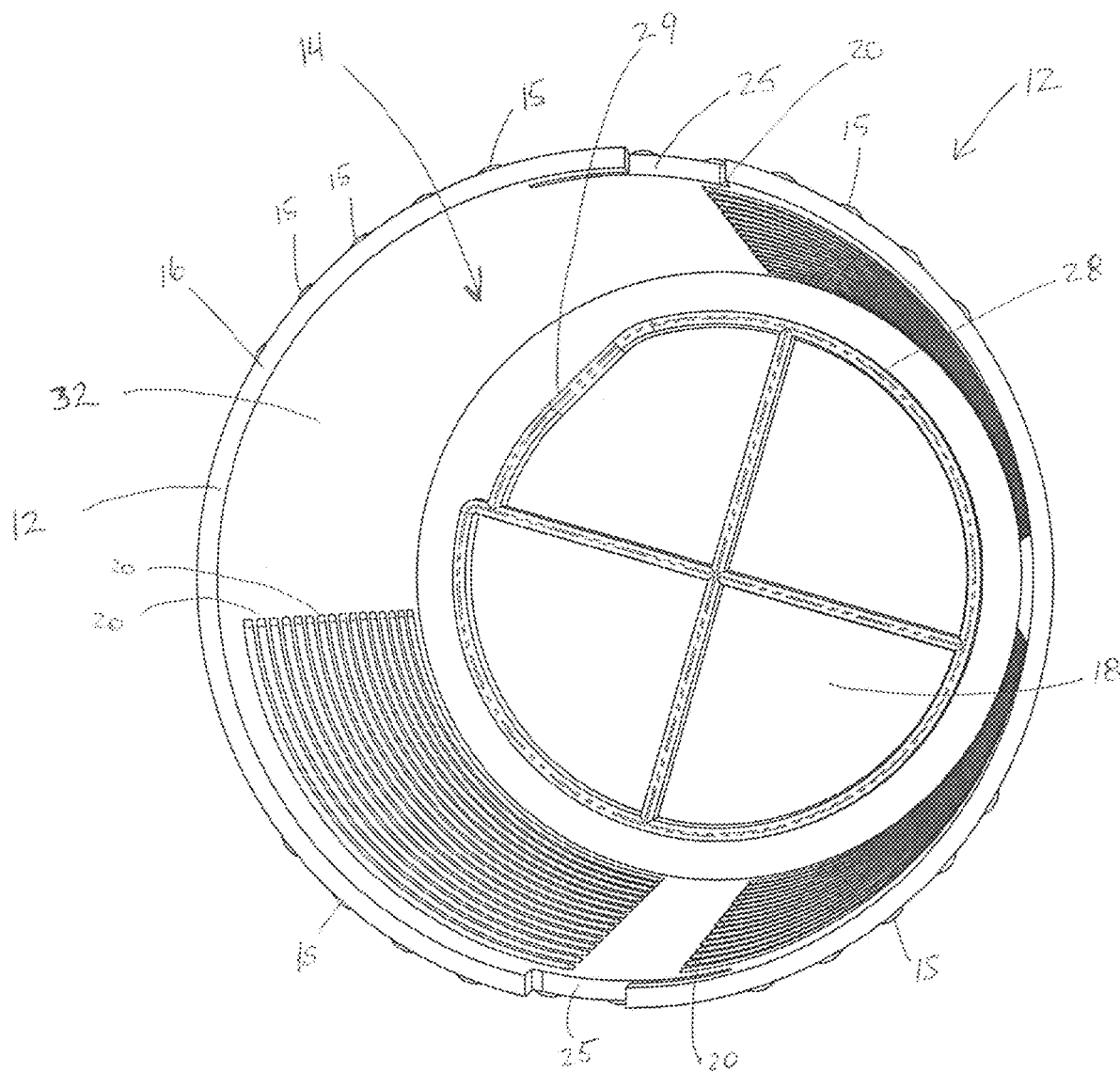
FIG. 4B is a top plan view of the internal chamber of the spa hose filter of the present disclosure with the cap removed to expose the internal lattice, solid wall, and perforated body.

With particular reference to FIGS. 4A and 4B, the closed bottom 18 of body 12 may include a lattice 28. Lattice 28 provides at least two benefits, lattice 28 may act to structurally reinforce body 12 but also serves as a form to position filter media 22 properly within internal cavity 14 of body 12 so that filter media 22 is positioned against and covers perforations 20. Pressure from water entering internal cavity 14 during use further acts to press filter media 22 against perforations 20. Lattice 28 preferably includes a spiraled segment 29 to accommodate the overlap of filter 22 wound inside chamber 14 such that it is positioned between lattice 28 and the inside wall of body 12.

A hose washer (not shown but widely known in the art) may be inserted in passage 26 to prevent water from leaking at the threaded connection between hose 30 and cap 24.

Figure 8:
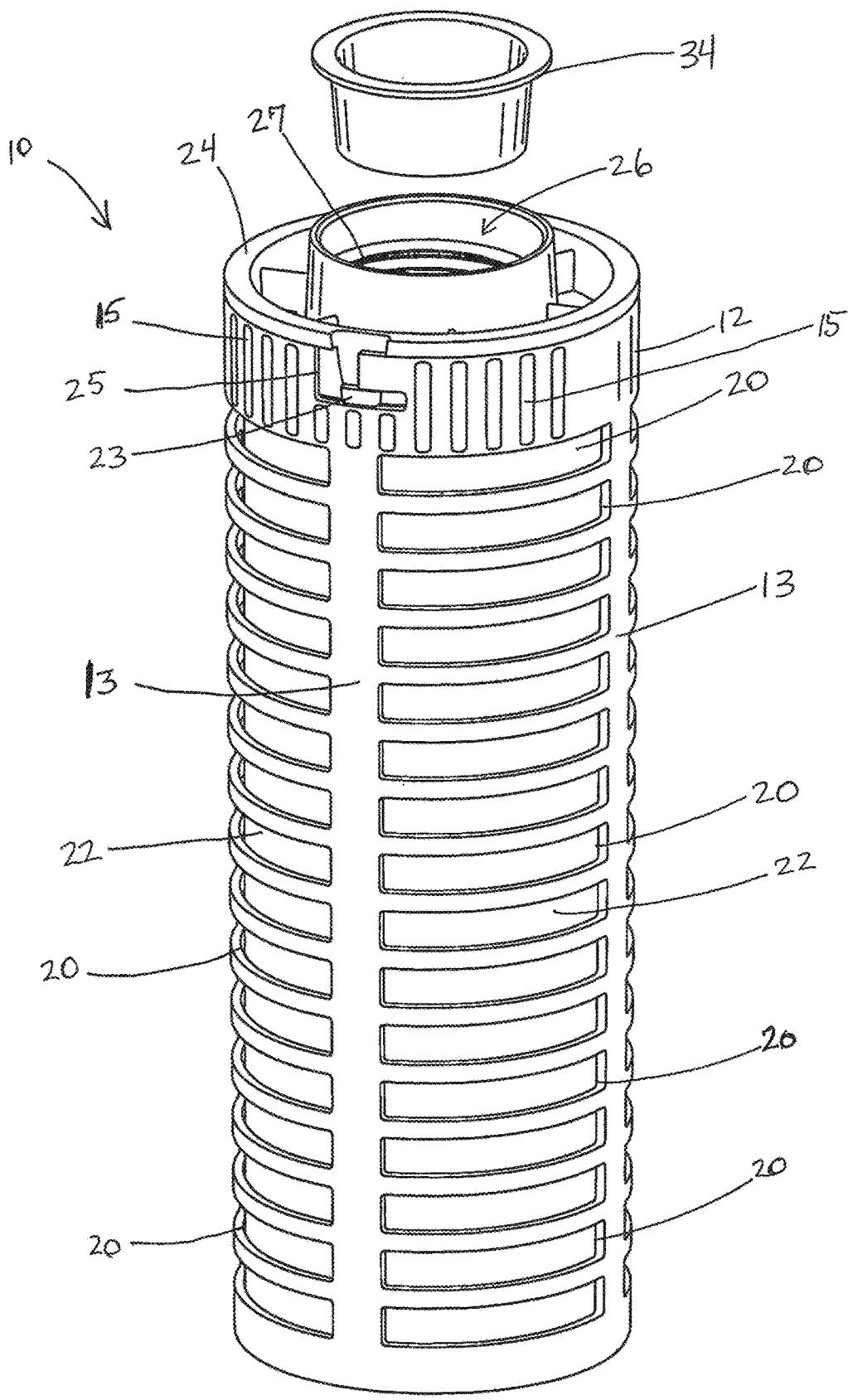
FIG. 8 is an isometric view of the spa hose filter of the present disclosure also depicting an optional transport plug.

With reference to FIG. 8, a transport plug 34 may be inserted into passage 26. Transport plug 34 acts to protect female threads 27 in passage 26 as well as help prevent debris from accidentally falling into internal cavity 14 during transport and storage of filter 10. In addition, transport plug 34, when inserted in passage 26 helps, in combination with filter media 22, retain sanitizer within internal cavity 14 during transport and storage.

Figure 6:
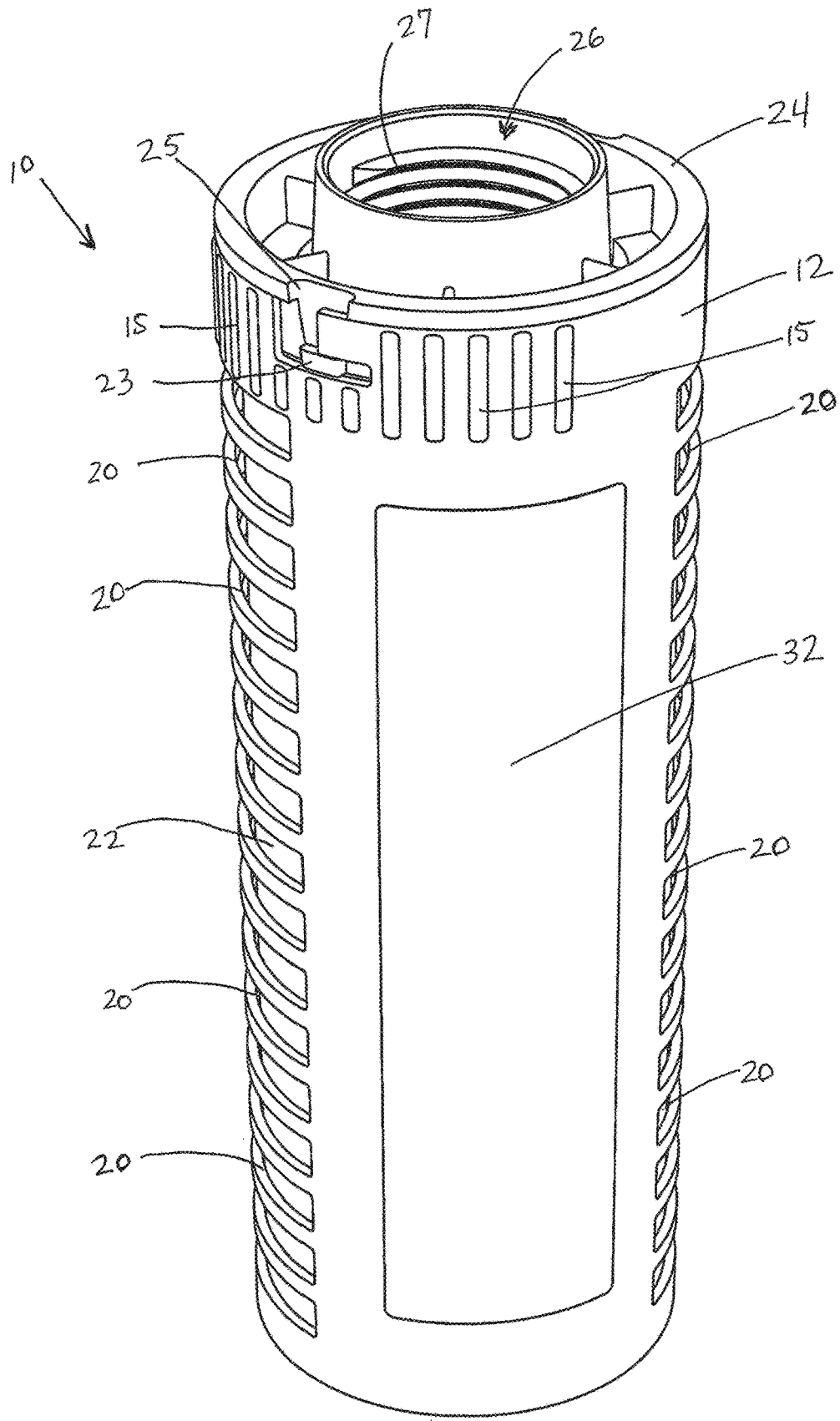
FIG. 6 is a side view of the spa hose filter of FIG. 5 rotated so as to expose the solid wall segment of the body.
Figure 7:
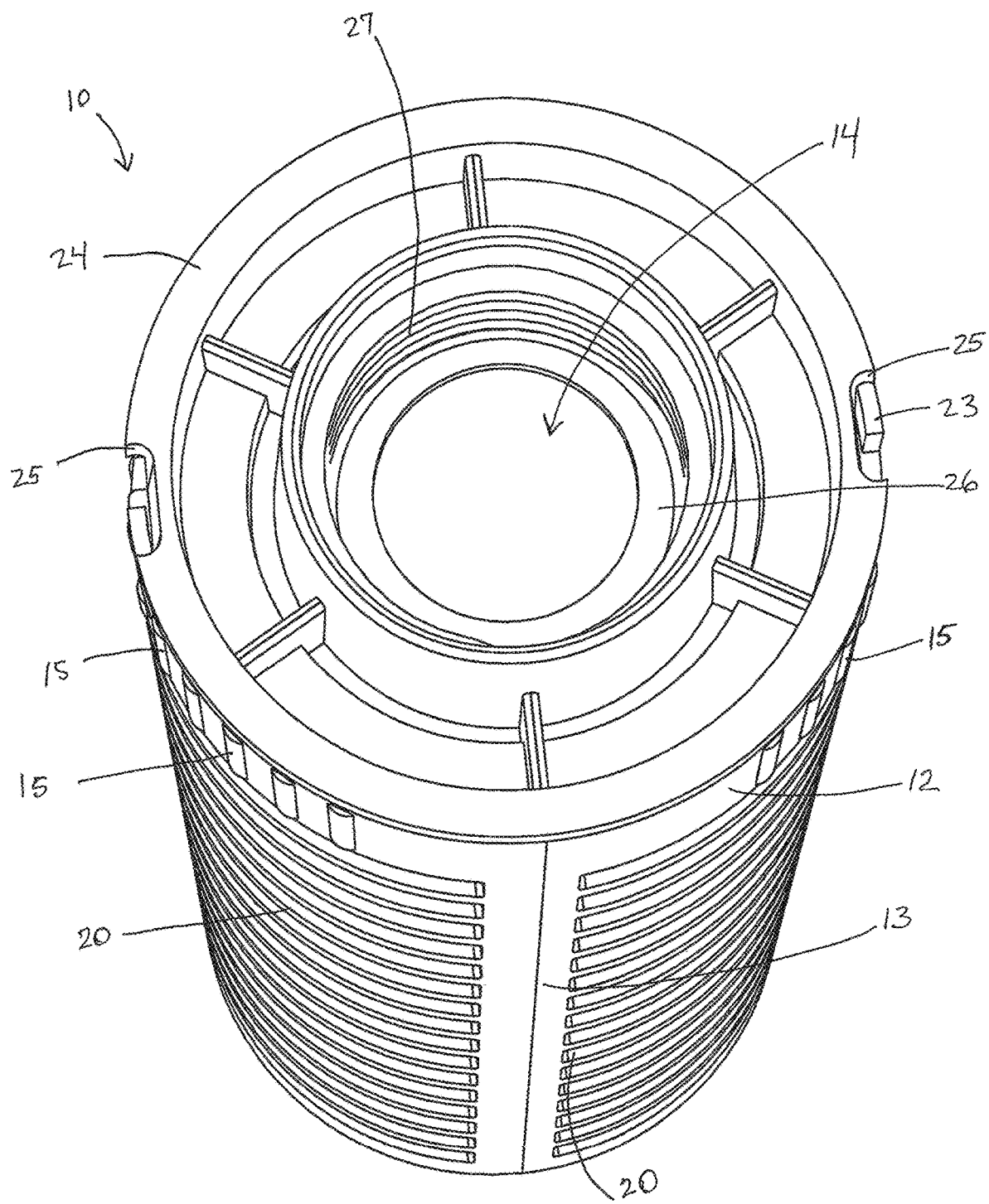
FIG. 7 is a top isometric view of the spa hose filter of the present disclosure wherein the internal cavity is visible through the passage in the cap and further depicting the female threads in the cap.

With particular reference to FIG. 6 (as well as FIG. 4B), body 12 includes in a preferred embodiment a solid wall segment 32 on its external circumference. Solid wall segment 32 includes no perforations and thereby prevents the passage of water (and sanitizer) through body 12 at solid wall segment 32. Solid wall segment 32 is intended to prevent separation of filter media 22 positioned within internal cavity 14 at the seam 38 where two ends 39 and 40 of the folded filter media 22 interact/intersect.

Figure 9:
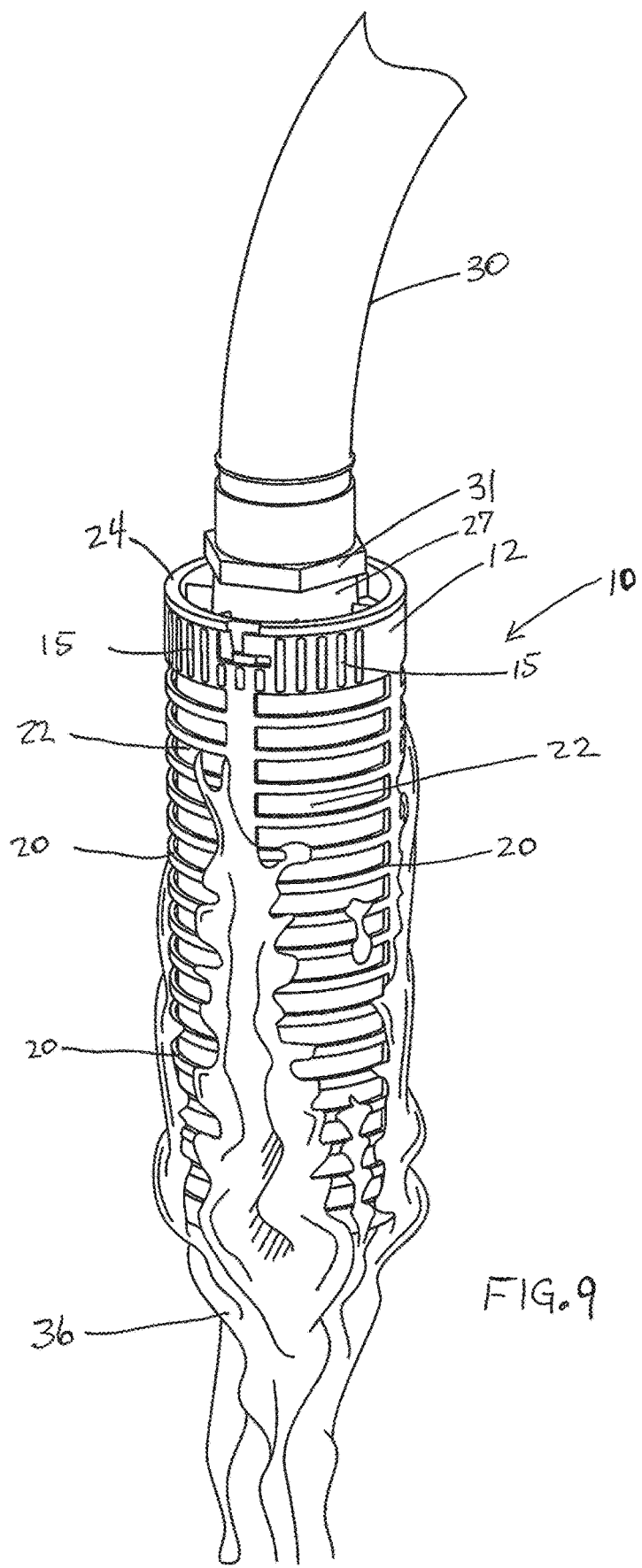
FIG. 9 is a side view of the spa hose filter of the present disclosure oriented vertically depicting a male connector of a garden hose threaded into the female threads of the passage such that water from the hose enters the internal cavity through the passage and exits through the perforations in the body after passing through the filter media.

FIG. 9 is a side view of spa hose filter 10 oriented vertically depicting a male connector 31 of a garden hose 30 threaded into the female threads 27 of passage 26 such that water 36 from the hose 30 enters internal cavity 14 through passage 26 and exits through perforations 20 in the body 12 after passing through filter media 22.

Figure 10:
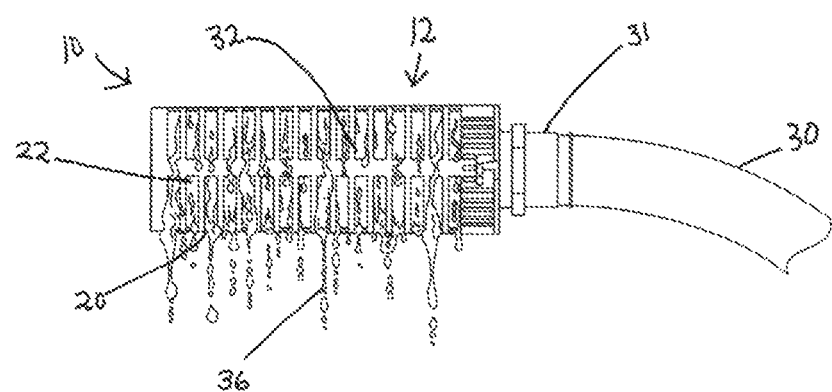
FIG. 10 is a side view of the spa hose filter of the present disclosure oriented horizontally depicting a male connector of a garden hose threaded into the female threads of the passage such that water from the hose enters the internal cavity through the passage and exits through the perforations in the body after passing through the filter media.

FIG. 10 is a side view of spa hose filter 10 oriented horizontally depicting a male connector 31 of garden hose 30 threaded into female threads 27 of passage 26 such that water 36 from hose 30 enters internal cavity 14 through passage 26 and exits through perforations 20 in body 12 after passing through filter media 22. Solid wall segment 32 of body 12 prevents water 36 from exiting through body 12 at the solid wall segment 32.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A filter for use with a hose that conveys water to fill a spa, the filter comprising:
   a body including an internal chamber;
   said body including a plurality of perforations exposing said internal chamber;
   a filter media positioned in said internal chamber covering said plurality of perforations;
   said body comprising a closed bottom including a lattice for positioning said filter media in said internal chamber;
   said internal chamber being in fluid communication with the hose so as to receive water and dispense the water from said plurality of perforations through said filter media.

2. The filter of claim 1 wherein said body includes an open top and a cap adapted to cover said open top.

3. The filter of claim 2 wherein said cap includes a threaded passage.

4. The filter of claim 1 wherein said internal chamber is filled with sanitizer.

5. The filter of claim 4 wherein said sanitizer is selected from a group consisting of an oxidizer and chlorine.

6. The filter of claim 1 wherein said filter media is 25 micron filter cloth.

7. The filter of claim 1 wherein said body includes a solid wall segment on its external circumference.

8. A filter for use with a hose that conveys water to fill a spa, the hose having a male threaded connector; the filter comprising:
   a cylindrical body including an external circumference, an internal chamber, an open top and a closed bottom;
   said external circumference including at least one perforation exposing said internal chamber;

a filter media covering said at least one perforation;
a cap adapted for covering said open top;
said cap including a passage having female threads which mate the male threaded connector;
said body adapted for receiving water from the hose through said passage into said internal chamber and dispensing the water from said at least one perforation through said filter media.

9. The filter of claim 8 wherein said internal chamber is filled with sanitizer.

10. The filter of claim 9 wherein said sanitizer includes chlorine.

11. The filter of claim 9 wherein said sanitizer includes an oxidizer.

12. The filter of claim 9 wherein said sanitizer is selected from a group consisting of an oxidizer and chlorine.

13. The filter of claim 8 wherein said filter media is inserted in said internal cavity.

14. The filter of claim 13 wherein said filter media is 25 micron filter cloth.

15. The filter of claim 8 including a hose washer is inserted in said passage.

16. The filter of claim 8 further including a transport plug inserted into said passage.

17. The filter of claim 8 wherein said body includes a plurality of perforations on its external circumference.

18. The filter of claim 17 wherein said body includes a solid wall segment on its external circumference.

19. The filter of claim 8 wherein said closed bottom of said body includes a lattice for positioning said filter media in said internal cavity.

* * * * *